S. Ward,
Corn Harvester.

No. 48,750.    Patented July 11 1865.

Witnesses.
Henry Morris
James P. Hall

Inventor.
Samuel Ward
per Munn & Co
attorneys

UNITED STATES PATENT OFFICE.

SAMUEL WARD, OF LANE, ILLINOIS.

IMPROVEMENT IN CORN-HARVESTERS.

Specification forming part of Letters Patent No. 48,750, dated July 11, 1865.

*To all whom it may concern:*

Be it known that I, SAMUEL WARD, of Lane, in the county of Ogle and State of Illinois, have invented a new and Improved Corn and Cane Harvester; and I do hereby declare that the following is a full, clear, and exact description thereof, which will enable others skilled in the art to make and use the same, reference being had to the accompanying drawings, forming a part of this specification, in which—

Figure 1:
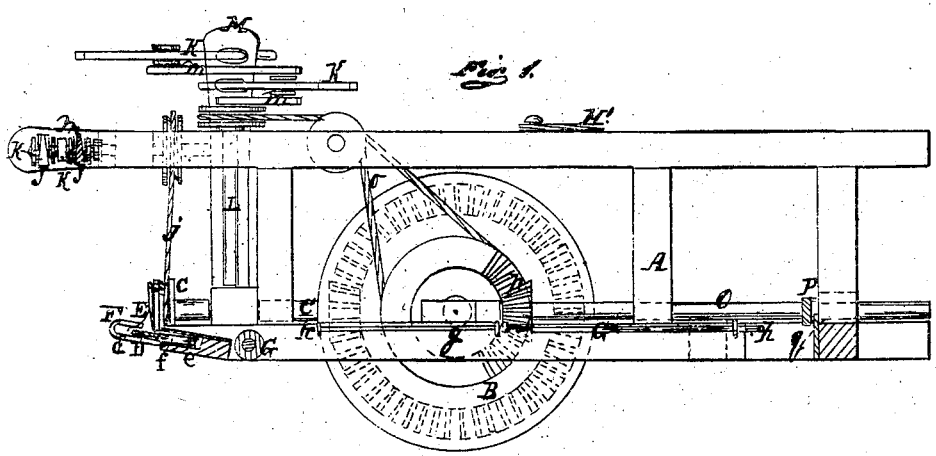
Figure 2:
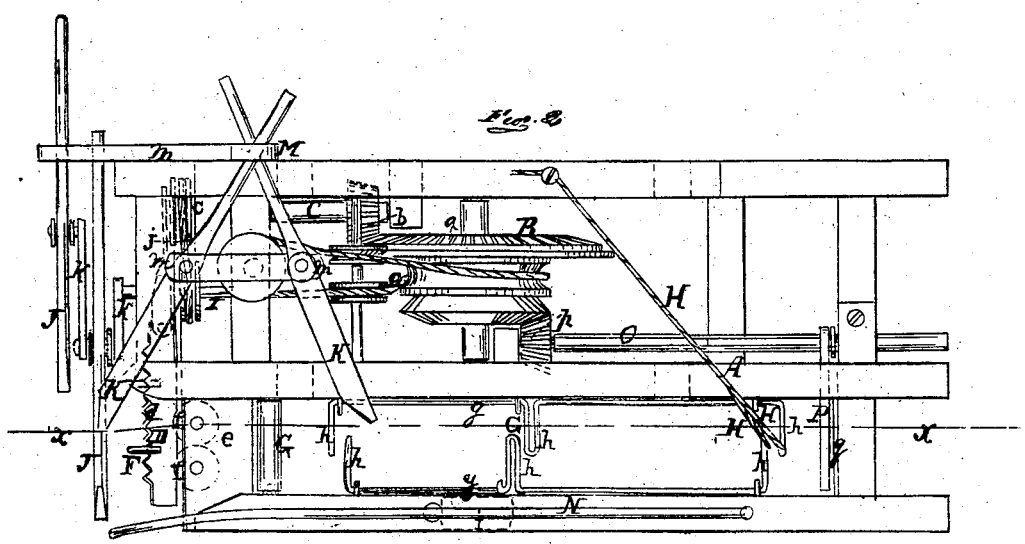

Figure 1 is a side sectional view of my invention, taken in the line $x\,x$, Fig. 2; Fig. 2, a plan or top view of the same.

Similar letters of reference indicate like parts.

This invention relates to a new and improved machine for harvesting Indian corn and sugar-cane.

The invention consists in a novel and simple means for stripping blades from the stalks, as well as in a means for gathering the corn or cane to the sickle and discharging it freely upon a bed so constructed that the corn or cane may be discharged in gavels from the machine.

A represents the framing of the machine, in which a driving-wheel, B, is placed, having teeth $a$ at one side which gear into a pinion, $b$, on a shaft, C, placed longitudinally in the framing and having a wheel, $c$, on its front end, from which the sickle D is driven by a pitman, E. The sickle D is provided with V-shaped or saw teeth $d$, and it works through fingers F, attached to a bar, $e$, at the front end of the framing A. The back of the sickle D does not bear against the bar $e$, but against friction-rollers $f$ placed therein. These rollers $f$ greatly diminish friction, and consequently lighten the draft of the machine.

Directly back of the bar $e$ in which the friction-rollers $f$ are placed there is fitted a horizontal roller, G, which is parallel with $e$, and back of the roller G there is a bed, $G^x$, composed of two shafts, $g\,g$, placed longitudinally in the framing and provided with arms $h$, which project from the shaft at right angles. This bed receives the cane or corn as it is cut, and the arms $h$ are retained in a horizontal position by cords or chains H, which are attached to a single cord or chain, H', the latter being secured to a pin on the framing A.

The side of the framing A opposite to the side near where the wheel B is placed is supported by a caster-wheel, $i$.

In the upper and front part of the framing A there is placed a short longitudinal shaft, I, which is driven by a belt, $j$, from the wheel $c$. This shaft I has two cranks, $k\,k$, at its front end, to each of which a bar or beater, J, is attached, said cranks being in reverse positions and the rear ends or shafts of the beaters being fitted in openings in a bar, $m$, attached to the framing. The beaters work in vertical planes directly in front of the sickle and serve to strip blades from the standing stalks.

K K represent two arms, constructed precisely like the bars or beaters J. The arms K K are connected to two reverse cranks, $m\,m$, at the upper end of a vertical shaft, L, and the shafts or rear ends of the arms K work through openings in an upright, M, on the framing. The arms K, it will be seen, work in horizontal planes, and they are designed to gather or draw the cane or corn to the sickle and also to throw it over on the bed $G^x$.

The machine is drawn along by a team in the same manner as other harvesters. The arms K are operated by a belt, $o$, from a pulley on the axle of the wheel B.

O is a shaft placed longitudinally in the framing A and driven by bevel-gears $p$ from the axle of wheel B. This shaft O has a knife, P, on its rear end, which, as the shaft O rotates, works over a ledger-blade, $q$, at the back part of the framing. This knife P cuts off the tops of the cane as it falls upon the bed $G^x$. When the bed $G^x$ has a sufficient quantity of cane or corn upon it to form a gavel the operator or driver releases the chain or cord H', and thereby allows the arms $h$ of the shafts $g$ to drop and discharge their load, the roller G facilitating the discharge, the arms being then raised and the cord or chain H' secured to hold the arms in proper position to receive another load.

Having thus described my invention, I claim as new and desire to secure by Letters Patent—

1. The bars or beaters J J, arranged to operate in vertical planes in front of and above the sickle D, substantially as and for the purpose specified.

2. The arms K K, arranged to operate in horizontal planes and in the described relation to the sickle D, for the purpose set forth.

3. The bed G×, composed of the two shafts $g\ g$, provided with the arms $h$, and arranged with cords or chains H H', for the purpose of discharging the cut cane or corn in gavels from the machine, substantially as described.

4. The arrangement of the bars or beaters J J, arms K K, in combination with the sickle D, and bed G×, with or without the guard N, combined and arranged to operate in the manner substantially as and for the purpose set forth.

5. The knife P, arranged to operate at the rear of the bed G×, substantially as and for the purpose specified.

SAMUEL WARD.

Witnesses:
A. S. HOADLEY,
J. T. MILLER.